United States Patent Office 3,247,387
Patented Apr. 19, 1966

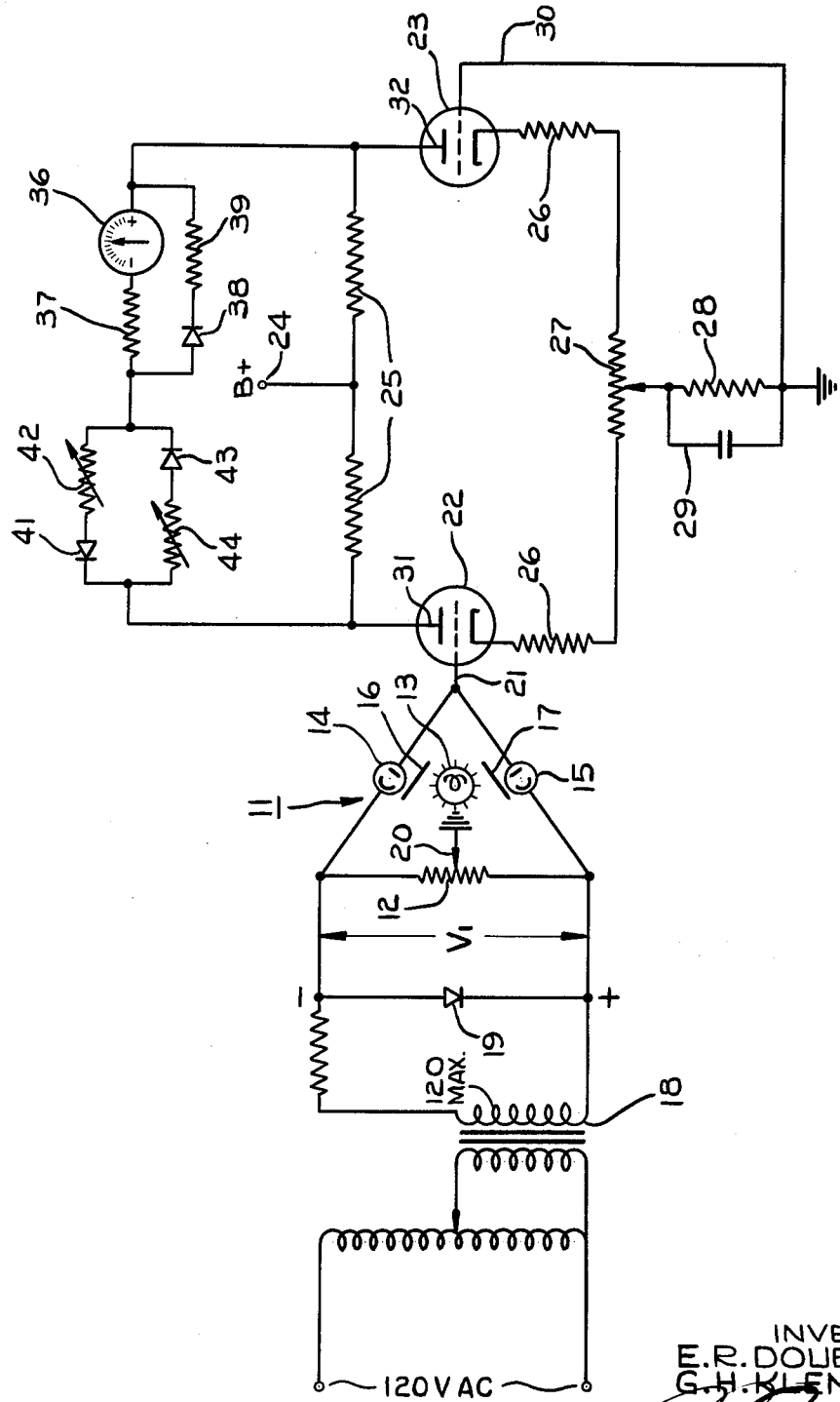

3,247,387
PHOTOELECTRIC BRIDGE CIRCUIT WITH INDICATOR COMPENSATED FOR NON-LINEAR INPUT
Edward R. Doubek, Jr., Brookfield, and Gerald H. Kienke, Batavia, Ill., assignors to Western Electric Company, Incorporated, New York, N.Y., a corporation of New York
Filed Oct. 9, 1962, Ser. No. 229,362
6 Claims. (Cl. 250—210)

This invention relates to an indicating circuit, and more particularly to an indicating circuit for improving the accuracy of film thickness measurements. It is an object of this invention to provide an improved circuit of such character.

In operations which require the deposition of opaque or translucent materials on a suitable transparent base to form a film, it is often desired to continuously monitor the thickness of the film in order that it may be maintained between prescribed limits. Among the methods known in the art for monitoring this thickness, there are some in which the conductive properties of photoelectric cells are utilized to derive a potential which varies as the film thickness varies. In these methods, the film, whose thickness is to be monitored, is interposed between a cell and a light source. Since the conductivity of a photoelectric cell is a function of the amount of light incident upon that cell, potentials may be established which are a function of the thickness of the film through which the light passes.

These potentials, however, are not proportional to film thickness due to the non-linear relationship which exists between increments in film thickness and corresponding increments in the amount of light passed. This non-linear relationship may best be visualized by imagining a thick film to which additional material is being added. It will be seen that the additional material will have relatively little effect on the amount of light passed. Conversely, the deposition of material on a clear base will tend to block a relatively large amount of light. It will be apparent that this non-linear relationship between film thickness and light passed must be compensated for before the thickness of the film can be accurately monitored.

The deposition of thin films also causes other problems which militate against accurate monitoring. When the film being measured is very thin, a slight irregularity in film deposition may result in a pin hole, which causes a wide variation in the amount of light passed. Such variations, unless heavily damped, act to cause oscillations in the indicating instrument, thus preventing accurate readings. While it would be an easy matter to use a conventional damping arrangement while thin films were being monitored, this would be highly unsatisfactory for thick film monitoring. Since the film being monitored may vary significantly in thickness, it is desirable to provide a circuit in which damping rates vary with the film thickness.

In other operations, the signal derived from the function to be indicated may be linear in its relationship to the function but the indicating device may be non-linear in its relationship to the signal, either because of the basic operation of the device or by virtue of the provision of a non-linear indicating scale. In such case the present invention can be employed to convert the linear incoming signal to a non-linear or modified signal as applied to or experienced by the indicating device.

Accordingly, another object of the invention is to provide an improved indicating circuit which is adapted to compensate for non-linearity of an indicating device with respect to the function to be measured.

It is still another object of the invention to provide an improved indicating circuit which is adapted to compensate for non-linearity of its input with respect to the function to be measured.

A further object of the invention is to provide an improved indicating circuit in which an indicating device is variably damped.

It is another object of the invention to provide an improved film thickness indicating circuit wherein an indicating device is variably damped, the rate of damping being dependent upon the thickness of the film being monitored.

It is a further object of the invention to provide an improved film thickness indicating circuit in which the response of a linearly calibrated meter is made closely indicative of true film thickness.

It is still another object of the invention to provide an improved indicating circuit having various of the characteristics specified above while being easily adjusted to allow for changes in operating conditions and circuit elements.

It is a still further object of the invention to provide such a circuit which is reliable in operation and economical to build.

In accordance with one embodiment of the invention, a meter is arranged in association with a rectifier and a resistor. The rectifier and the resistor are so connected that signal current flows through the resistor only when the signal is of one particular polarity. The resistor and the meter are so connected that flow of signal current through the resistor diminishes the effective sensitivity. The rectifier and resistor may be arranged in parallel with each other, the combination being connected in series with the meter. With the signal of one particular polarity, the current passing through the meter must also pass through the resistor whereby the effective sensitivity of the meter is diminished.

Alternatively, the resistor and the rectifier may be in series with each other, the combination being in parallel with the meter. With the signal of one particular polarity the current may, in part, by-pass the meter, whereby the effective sensitivity of the meter is again reduced. In this instance the meter is variably damped by the resistor, depending on the polarity of the signal.

The invention, together with further objects and advantages thereof, will best be understood by reference to the following description taken in connection with the accompanying drawing, in which the single figure is a schematic representation of one embodiment of the present invention.

Referring now in detail to the drawing, there is illustrated an electronic testing network. Included in this network is a bridge circuit 11 containing a center tapped resistor 12, a light source 13, and two identical photoelectric cells 14 and 15. The cells 14 and 15 are shaded from their common light source by the films 16 and 17 respectively, the film 17 being of a desired, standard thickness.

A potential $V_1$ is established by an arrangement of a variac 18 and a rectifier 19 such that current flow through the parallel arrangement of the resistor 12 and the cells 14 and 15 causes pulsating D.C. potentials to be established across each of these elements. When cells 14 and 15 are shaded by films of equal thickness, equal amounts of light are transmitted through the films to become incident upon the cells. Due to their identical conductive properties the potential established across each of the cells is equal to one-half of the total potential $V_1$.

Looking now at the center tapped resistor 12, one may see that the potential established across each half of the resistor is also equal to one-half of the total potential $V_1$. It follows from this that the potentials at the center tap 20 and at the common junction 21 of the two cells will be equal. This dictates that the junction 21 will be at ground potential when the films 16 and 17 are of equal thickness since the center tap 20 is at ground potential.

The junction 21 will not remain at ground potential in actual operations unless films 16 and 17 are of equal thickness, but instead will vary in the same general manner in which the thickness of film 16 varies due to the relative conductivities of cells 14 and 15. That is, when film 16 is thicker than the reference film 17, a positive potential will exist at the junction 21; and when the film 16 is thinner than the reference film 17, a negative potential will exist at that junction. It should be remembered that the potential at 21 is not directly proportional to changes in thickness of the film 16 since there is a non-linear relationship between the film thickness and the amount of light passed to the associated cell. As thus described, the bridge 11 is seen to provide a differential output responsive to the changes in conductivity of the photoelectric cells and, may therefore, be thought of as a differential circuit.

The potential at the junction is applied to the grid 21 of a triode 22 which is one element in a balanced electronic comparator network. The comparator network includes identical triodes 22 and 23, a common power supply 24, identical plate resistors 25, identical cathode resistors 26, and an adjustably tapped resistor 27, whose tap is connected to ground through a resistor 28 and a by-pass capacitor 29. The use of the balancing resistor 27 is widely known in the art as a means for compensating for differences in the characteristics of paired triodes. Here, the resistor 27 may also be used to readjust the circuit after replacement of elements such as the photoelectric cells. The grid 30 of the triode 23 is connected to ground, and the plates 31 and 32 of the two triodes are connected to the plate resistors 25, all as shown.

Connected between the plates 31 and 32 and across the two plate resistors 25 is a meter circuit whose principal element is a microammeter 36. A resistor 37 is arranged in series with the meter 36, and a series arrangement of a diode 38 and a resistor 39 is arranged in parallel with the resistor 37 and the meter 36. Immediately to the left of the above referred to circuit elements the meter circuit has parallel branches, one including a diode 41 and a resistor 42, and the other including a diode 43 and a resistor 44.

The operation of the circuit will now be described starting with the hypothesis that the unknown film 16 is of the same thickness as the standard film 17. Under these conditions, the grid 21 of the triode 22 is at ground potential, as previously explained, whereby the two triodes conduct the same amount of current. The plates of the two triodes will, therefore, be at the same potential and no voltage is applied to the meter circuit.

When the film 16 becomes thicker than the standard film 17, less light will pass to the photocell 14 whereby the grid 21 of the triode 22 becomes more positive. The resulting increase in current in the triode 22 causes a greater voltage drop across its plate resistor 25, with the result that the left end of the meter circuit becomes more negative than the right-hand end.

Under these conditions the signal current is blocked by the diode 38 such that the entire signal current flows through the meter 36. Since the entire signal current flows through the meter, the effective sensitivity of the meter is at a maximum. The signal current also flows through the upper branch of the left-hand portion of the meter circuit and hence through the resistor 42. The function of the resistor 42 is explained below.

When the unknown film 16 is thinner than the standard film 17, more light passes to the photocell 14 with the result that the voltage on the grid 21 of the triode 22 becomes more negative. This reduces the current passing through the triode 22 and through its plate resistor 25. Accordingly, the plate 31 becomes more positive than the plate 32.

The resulting signal current passes through the lower branch of the left-hand portion of the meter circuit and hence through the resistor 44. The function of the resistor 44 is also explained below. The signal current, in addition to passing through the meter 36, may pass through the diode 38 and the resistor 39. Since only some fraction of the signal current passes through the meter 36, it will be apparent that the effective sensitivity of the meter is diminished.

As explained above, the rate of change of the D.C. signal resulting from a change in thickness of the unknown film is greater when the film is below normal thickness than when it is above normal thickness. One effect of the diode 38 and the resistor 39 is to compensate for this discrepancy such that there is substantially a linear relationship between the meter reading and the thickness of the film 16. More specifically, when the film is thin, such that a change in film thickness produces a large change in signal voltage, the meter is rendered less sensitive. When the film 16 is too thick, such that a change in the film thickness produces a small change in the signal voltage, the sensitivity of the meter is made to be maximum.

The diode 38 and the resistor 39 also provide variable damping of the meter 36. More particularly, when the film 16 is below normal thickness, the direction of the signal current is such that the resistor 39 parallels the meter 36 and provides significant damping. When the unknown film 16 is above normal thickness, the direction of the signal current through the meter circuit is such that the resistor 39 is not effective. While a sudden drop in the value of signal current, when the current flows from right to left in the meter circuit, causes a back E.M.F. in the meter which may be damped out by circulating through the diode 38 and the resistor 39, the effect of this damping is substantially less than when a thin film causes current to flow from left to right. Stated otherwise, the damping effect of the resistor 39 is greater when the meter is rendered less sensitive by the passage of a portion of the signal current through the resistor 39.

In one particular embodiment of the invention, the desired variation in damping was obtained through the use of a value of the resistor 39 which was sufficiently low that it over-compensated with regard to effective meter sensitivity. Accordingly, the resistor 42 was made larger than the resistor 44. Therefore, when the signal current flowed from right to left, a larger resistor 42 was arranged in series with the meter than when the signal current flowed from left to right. Since the difference between the values of the resistors 42 and 44 affects the relative effective sensitivity of the meter 36, depending upon the polarity of the signal, while having substantially no effect upon the damping of the meter, the left-hand portion of the meter circuit can be employed to increase or decrease the compensation effect of the resistor 39.

The following values for the various resistors were found to be effective where the meter 36 was a microammeter in which full scale deflection was produced by a current of 20 microamperes:

| | | |
|---|---|---:|
| Resistor 39 | ohms | 100 |
| Resistor 42 | do | 1,000 |
| Resistor 44 | do | 10,000 |
| Resistors 25 | do | 39,000 |
| Resistors 26 | do | 470 |
| Resistor 27 | do | 1,500 |
| Resistor 28 | do | 330 |
| Resistor 12 | do | 100,000 |
| Capacitor 29 | microfarads | 10 |
| Triodes 22 and 23 | | 12 AU7A |
| Photocells 14 and 15 | | Clairex CL3 |
| Diodes | | IN58A |

The resistor 37 is employed merely to effect more linear damping of the meter, the resulting increased voltage across the diode 38 causing more effective operation of the diode. Presence of the resistor 37, while making the meter damping more linear, naturally reduces the damping effect of the resistor 39. In the specific example for which values are given immediately above, the resistor 37 was omitted.

The above-described embodiment of the invention includes numerous refinements which are not essential to the fundamental invention. In accordance with one fundamental embodiment of the invention, the meter circuit includes only the meter 36, the diode 38 and the resistor 39. More specifically, the resistors 37, 42 and 44 and the diodes 41 and 43 may be omitted. In this fundamental embodiment, to values of the effective meter sensitivity are obtained. With a thick film, all of the signal current flows through the meter; with a thin film, part of the signal current passes through the diode 38 and the resistor 39. A variation in damping results, the magnitude in the variation in the damping being controlled by the desired degree of difference in sensitivity.

Another fundamental form of the invention involves the use of only the meter 36, the diode 41 and the resistor 44. In this case the diodes 38 and 43, and the resistors 37, 39 and 42 may be omitted. In this fundamental form of the meter circuit a thick film causes current to flow through the meter 36 and through the diode 41, the diode 41 serving as a by-pass for the resistor 44. A thin film causes current to flow through the resistor 44 and the meter 36 such that the effective sensitivity of the meter is diminished. In this manner, two values of effective meter sensitivity are obtained, there being no significant effect upon meter damping. The effectiveness of the circuit can be increased by adding the diode 43.

In the refined form of the invention illustrated in the drawings, the resistors 42 and 44 are made adjustable such that the two values of effective meter sensitivity may be adjusted to more closely compensate for the non-linearity of the D.C. signal applied to the meter circuit with respect to the film thickness.

In the embodiment of the invention described above the indicating circuit is applied to the modification of a signal to make it approximate linearity with respect to the function to be indicated. As previously indicated, it is equally applicable to make a signal non-linear with respect to the function in order to compensate for non-linearity of the indicating device. Thus, the invention may serve to compensate for non-linearity of the indication by an indicating device with respect to a function to be indicated, whether the non-linearity arises between the functon and the signal or between the signal and the ultimate indication. The invention is, of course, applicable to situations in which the indicating device is something other than a meter.

While certain embodiments of the invention have been disclosed, many modifications will be apparent and it is intended that the invention be interpreted as including all modifications which fall within the true spirit and scope of the invention.

What is claimed is:

1. An indicating circuit for compensating for non-linearity of an indicating device with respect to the function to be indicated, said indicating circuit comprising:
   a differential circuit responsive to the function to be indicated for producing a D.C. output signal, said signal changing in polarity as the function being indicated varies above and below a standard value;
   a comparison circuit electrically connected to the output of said differential circuit, said comparison circuit having two output terminals across which is established a potential signal difference in response to a D.C. signal applied to the input of said comparison circuit, the direction and magnitude of the potential signal difference being dependent on the polarity and magnitude of the D.C. signal applied to the input of said comparison circuit by said differential circuit, and
   compensated indicating means for providing an accurate indication of the value of the function to be indicated, said indicating means including an indicating device, at least one resistor, and at least one rectifier arranged and electrically connected together across the two terminals of said comparison circuit so as to inhibit the flow of signal current through said resistor in one direction in response to the existence of a D.C. signal of one polarity applied to the input of said comparison circuit, and to allow a predetermined amount of signal current to flow through said resistor in the direction opposite to said one direction in response to the existence of a D.C. signal of a polarity opposite said one polarity so as to diminish the effective sensitivity of said indicating device.

2. An indicating circuit of the type specified in claim 1, wherein said resistor and said rectifier are arranged in series with each other and in parallel with said indicating device across the two terminals of said comparison circuit, whereby said resistor and rectifier also serve to provide variable damping of said indicating device depending on the polarity of the D.C. signal.

3. An indicating circuit as specified in claim 1, wherein said resistor and said rectifier are arranged in parallel with each other and in series with said indicating device across the two terminals of said comparison circuit.

4. An indicating circuit for compensating for non-linearity of an indicating device with respect to a parameter of an article to be measured and indicated, said measuring circuit comprising:
   a differential circuit including a bridge with two photo-electric detecting means connected in two different arms of said bridge so that said differential circuit is responsive to the parameter to be measured and indicated, said differential circuit producing a D.C. signal at the output thereof, which signal changes in polarity as the function to be indicated varies above and below a standard value;
   a comparison circuit including a balanced pair of amplifiers electrically connected to the output of said differential circuit, the gain of said amplifiers being adjustable selectively for input signals of positive and negative value applied thereto and including a pair of output terminals across which is established a potential signal difference in response to a D.C. signal applied to the input of said comparison circuit, the direction and magnitude of said potential signal difference being dependent on the polarity and magnitude of the D.C. signal applied to the input of said comparison circuit, and
   compensated indicating means for providing an accurate indication of the value of the function to be indicated, said compensated indicating means including an indicating device, at least one resistor, and at least one rectifier arranged and electrically connected together across the two terminals of said comparison circuit so as to inhibit the flow of signal current through said resistor in one direction in response to the existence of a D.C. signal of one polarity applied to the input of said comparison circuit, and to allow a predetermined amount of signal current to flow through said resistor in the direction opposite to said one direction in response to the existence of a D.C. signal of a polarity opposite said one polarity so as to diminish the effective sensitivity of said indicating device.

5. An indicating circuit as specified in claim 4, wherein said resistor and said rectifier are arranged in series with each other and in parallel with said indicating device across the two terminals of said comparison circuit, whereby said resistor and rectifier also serve to provide variable damping of said indicating device depending on the polarity of the D.C. signal.

6. An indicating circuit as specified in claim 4, wherein said resistor and said rectifier are arranged in parallel with each other and in series with said indicating device across the two terminals of said comparison circuit.

References Cited by the Examiner

UNITED STATES PATENTS

| | | | |
|---|---|---|---|
| 1,287,970 | 12/1918 | Greinacher et al. | 250—210 X |
| 2,420,058 | 5/1947 | Sweet | 250—214 |
| 2,492,901 | 12/1949 | Sweet | 324—132 |
| 2,547,650 | 4/1951 | McCool | 324—119 |
| 2,603,779 | 7/1952 | Ferrill | 324—119 |
| 2,868,995 | 1/1959 | Kelsey et al. | 250—210 |
| 2,902,651 | 9/1959 | Friedrichs | 324—119 |
| 2,993,121 | 7/1961 | Esher | 250—214 X |
| 3,004,220 | 10/1961 | Williamson | 324—132 |
| 3,014,135 | 12/1961 | Hewlett et al. | 250—214 X |
| 3,053,985 | 9/1962 | Grammer et al. | 250—214 X |
| 3,076,375 | 2/1963 | Donnell | 250—210 X |

FOREIGN PATENTS 861,582   2/1961   Great Britain.

RALPH G. NILSON, *Primary Examiner.*

ARCHIE R. BORCHELT, *Examiner.*

ELROY STRICKLAND, MICHAEL A. LEAVITT
*Assistant Examiners.*